US006880249B2

(12) United States Patent
Long et al.

(10) Patent No.: US 6,880,249 B2
(45) Date of Patent: Apr. 19, 2005

(54) MOLDED PLASTIC BLADE HOLDER

(76) Inventors: John W. Long, 1003 S. 24th St., Omaha, NE (US) 68108; Dale R. Ross, 425 Liberty Dr., McPherson, KS (US) 67460

( * ) Notice: Subject to any disclaimer, the term of this patent is extended or adjusted under 35 U.S.C. 154(b) by 0 days.

(21) Appl. No.: 10/342,613

(22) Filed: Jan. 15, 2003

(65) Prior Publication Data

US 2004/0134326 A1 Jul. 15, 2004

Related U.S. Application Data

(60) Provisional application No. 60/349,199, filed on Jan. 15, 2002.

(51) Int. Cl.[7] ................................................ A22C 17/04

(52) U.S. Cl. ........................................... 30/276; 30/347

(58) Field of Search .................. 30/276, 347; 452/137, 452/149; 83/698, 341, 676, 696.41; 74/DIG. 10, 443, 434, 421 R

(56) References Cited

U.S. PATENT DOCUMENTS 4,077,274 A * 3/1978 Johnson ...................... 74/425
4,236,531 A * 12/1980 McCullough ................ 30/276
4,296,313 A * 10/1981 Horner et al. ............ 235/61 L
6,615,494 B1 * 9/2003 Long et al. .................. 30/276

FOREIGN PATENT DOCUMENTS

JP 361223368 * 10/1986

* cited by examiner

*Primary Examiner*—Stephen Choi
(74) *Attorney, Agent, or Firm*—Adam H. Jacobs

(57) ABSTRACT

In combination, a toroidal rotary knife blade having a sharpened circular lower edge and an upper blade holder engagement section and a blade holder for the toroidal rotary knife blade. The blade holder includes a generally toroidal blade holding ring having an upper gear-engaging section including a plurality of gear teeth formed thereon for intermeshing with a drive gear and a lower blade engagement and retention section adapted to receive and retain the toroidal rotary knife blade therein. The blade holding ring is constructed of material selected from the group consisting of plastic, polyvinyl chloride, polyethylene, polypropylene, polystyrene, vinyl, and polyethylene terephthalate. Finally, the generally toroidal blade holding ring is operative to reduce noise and vibration emitted therefrom during rotation of the generally toroidal blade holding ring by a drive gear due to the use of plastic construction materials.

3 Claims, 4 Drawing Sheets

MOLDED PLASTIC BLADE HOLDER

CROSS-REFERENCE TO RELATED APPLICATION

This application claims priority to the filing date of related provisional patent application Ser. No. 60/349,199 filed on Jan. 15, 2002.

BACKGROUND OF THE INVENTION

1. Technical Field

The present invention is directed to blade holding devices and, more particularly, to a toroidal molded plastic blade holder for use with toroidal blades commonly used on defatting and boning knives in the meat packing industry, the molded plastic blade holder including a lower blade-engaging section and an upper gear-engaging section.

2. Description of the Prior Art

The meat packing and processing industry has become increasingly important as the world population continues to grow thereby increasing the need for meat and meat products. As a result of the increased demand for meat, the meat packing industry had to become more efficient in its meat processing and packing operations. Through the use of improved technology and "assembly-line" like operations, the meat industry has been able to increase the production of meat and meat products. However, the industry requires individuals to use some form of knife to remove bones and trim the excess fat from the meat. Accordingly, the meat packing industry has attempted to produce knives that allow the user to debone and trim meat faster, safer, and more economically; a long-felt-need which has yet to be fully addressed.

The prior art discloses knives that typically have a handle, a drive mechanism, and a blade. Although there are numerous types of powered knives which are used, one of the more commonly used types includes a circular blade which rotates at a high rate of speed, the blade being rotatably supported on a handle. These knives are used to remove and trim fat from the carcass by "planing" the knife over the area on the carcass which is being trimmed and the spinning of the blade cuts the tissue being contacted to remove a strip from the carcass. It has been found that these types of blades are very efficient at removing tissue from the carcass, but there are inherent problems with the use of these knives that have not been solved by the prior art.

One of these problems in the meat packing industry is the large amount of vibration and noise emitted by the rotary knives. The nature of the meat packing industry requires the blades to rotate at extremely high-speeds. To achieve the required speeds, knives of the prior art incorporate a drive mechanism consisting of a drive shaft and a gear which are composed of metal. The drive shaft would engage the gear and both the shaft and gear would spin to rotate the blade which is also made of metal along with the blade support ring. As a result, the metal-on-metal contact of the knife components operating at high-speeds would cause a high-pitched noise that could damage the eardrum and impair hearing. Additionally, the lack of a damper in the drive mechanism and high-speed operation causes severe vibration of the knife that could result in loss of control of the knife and injury to the user. While it is possible to reduce vibrations through the use of such a damping device, this does not completely solve the problem. The metal-on-metal contact of the drive mechanism and the knife blade holder continues to be a main cause of vibration, and there is therefore a need for a knife blade holder that will reduces the noise and vibration rendering the rotary knife safer and more comfortable to use.

Construction of a blade holder out of materials other than metal can be risky due to the high speed of rotation of the rotary knife. Unless the structural integrity of the material can be guaranteed, there is the chance that the blade holder will fracture and spin out of the rotary knife, thus causing injury to the user of the knife. Furthermore, the material must be cost-effective to use in the blades or it will not be useful to the industry. There is therefore a need for an improved, safe and cost-effective blade holder that will resolve many of the problems currently encountered in the art.

Therefore, an object of the present invention is to provide an improved molded plastic blade holder for a rotary knife.

Another object of the present invention is to provide an improved molded plastic blade holder for a rotary knife that is molded directly to the rotary knife blade to provide a safe and efficient cutting blade for the rotary knife.

Another object of the present invention is to provide an improved molded plastic blade holder for a rotary knife that significantly reduces vibration and noise produced by the knife.

Finally, it is an object of the present invention to provide an improved molded plastic blade holder for a rotary knife which is relatively simple and inexpensive to manufacture and is safe and efficient in use.

SUMMARY OF THE INVENTION

The present invention is directed to a combination of elements, specifically including a toroidal rotary knife blade having a sharpened circular lower edge and an upper blade holder engagement section and a blade holder for the toroidal rotary knife blade. The blade holder includes a generally toroidal blade holding ring having an upper gear-engaging section including a plurality of gear teeth formed thereon for intermeshing with a drive gear and a lower blade engagement and retention section adapted to receive and retain the toroidal rotary knife blade therein. The blade holding ring is constructed of material selected from the group consisting of plastic, polyvinyl chloride, polyethylene, polypropylene, polystyrene, vinyl, and polyethylene terephthalate. Finally, the generally toroidal blade holding ring is operative to reduce noise and vibration emitted therefrom during rotation of the generally toroidal blade holding ring by a drive gear due to the use of plastic construction materials.

The present invention as thus described has many advantages over those devices found in the prior art. The plastic blade holder provides the dual advantage of long lifespan and a significant reduction in noise emission from the rotary knife. Furthermore, the construction materials used in connection with the present invention are relatively inexpensive and can easily be molded into the desired toroidal shape. Additionally, the integral construction combination of the blade and blade holder of the present invention will generally prevent accidental dislodgement of the blade during its operation. Finally, the present invention, in reducing noise and vibration of the rotary knife during use, will help prevent injury to the knife users, thus rendering the invention far more efficient and safe for use than those devices found in the prior art. Therefore, the present invention is seen to provide substantial improvements over those devices found in the prior art.

DESCRIPTION OF THE PREFERRED EMBODIMENT

Figure 1:
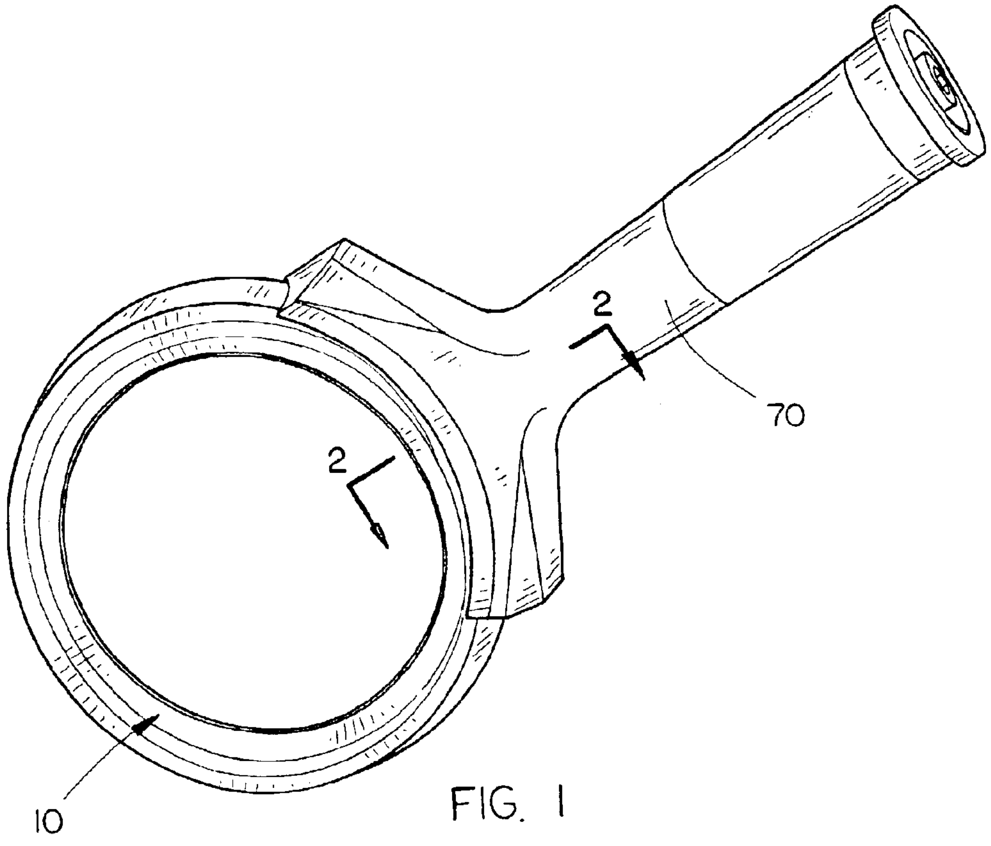
FIG. 1 is a perspective view of a molded plastic blade holder of the present invention mounted on a cutting device.

The molded plastic blade holder 10 of the present invention is shown best in FIGS. 1–10 as including a generally toroidal molded plastic ring 12 which includes a lower blade-engaging section 14 and upper gear-engaging section 16. The toroidal blade 50 would be of the standard type used with boning and defatting knives with which the present invention is intended to be used, and thus would include a sharpened circular lower edge 52 and an upper section 54 which would be engaged by the lower blade-engaging section 14 of toroidal ring 12.

One of the major problems encountered with the use of the boning and defatting knives currently used in the meat packing industry is that they are extremely noisy and have a great deal of vibration due to the metal on metal meshing of the drive gear with the toothed upper section of the standard defatting blade. This results in increased chances for hearing damage and bodily injury to the person using the device, which, of course, is undesirable. Furthermore, because of the high-speed rotation of the circular blade, the resulting noise is high-pitched in frequency, thus exacerbating the potential for hearing damage. The present invention is designed to alleviate those problems found in the prior art.

Figure 2:
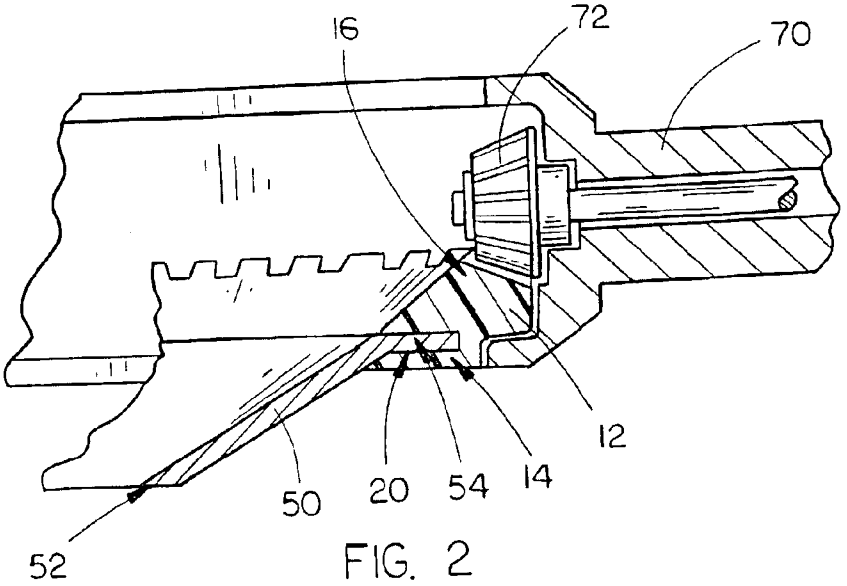
FIG. 2 is a side detail elevational view of the drive shaft interacting with the blade holder of the present invention.
Figure 4:
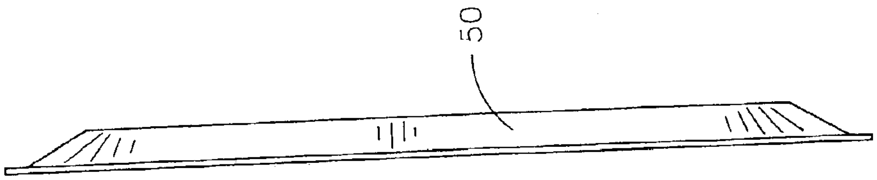
FIG. 4 is a side elevational view of the present invention.
Figure 3:
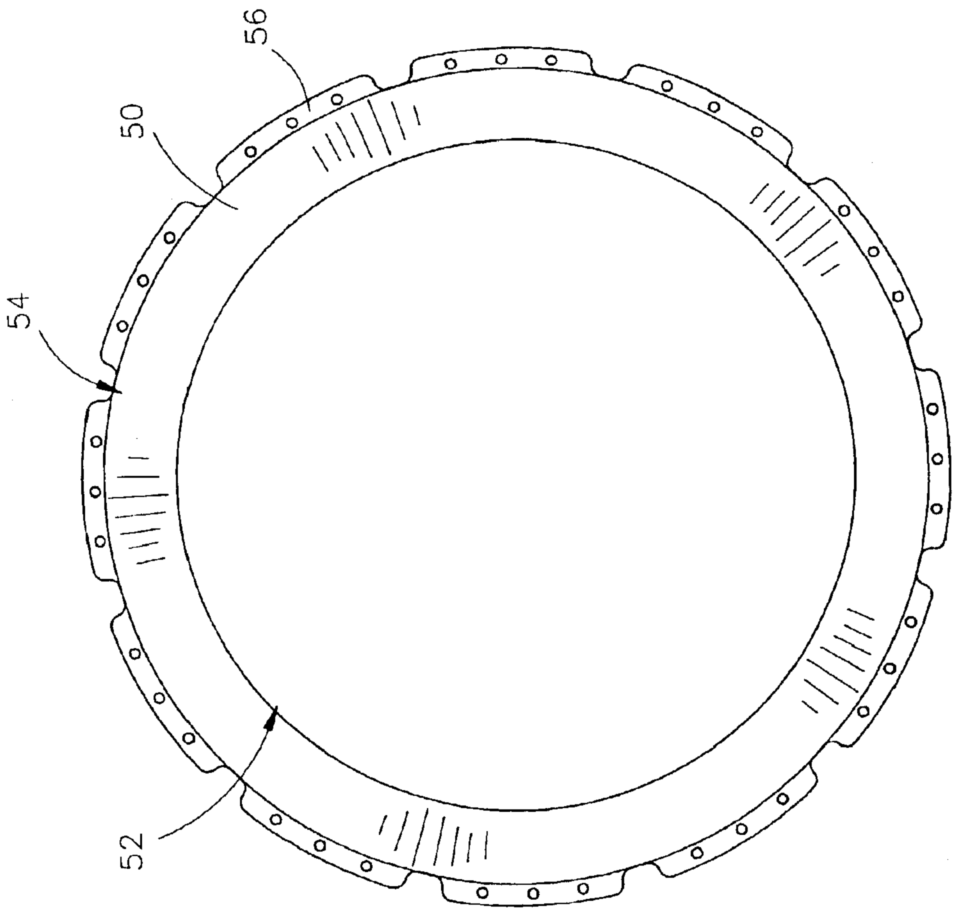
FIG. 3 is a top plan view of the blade of the present invention.
Figure 7:
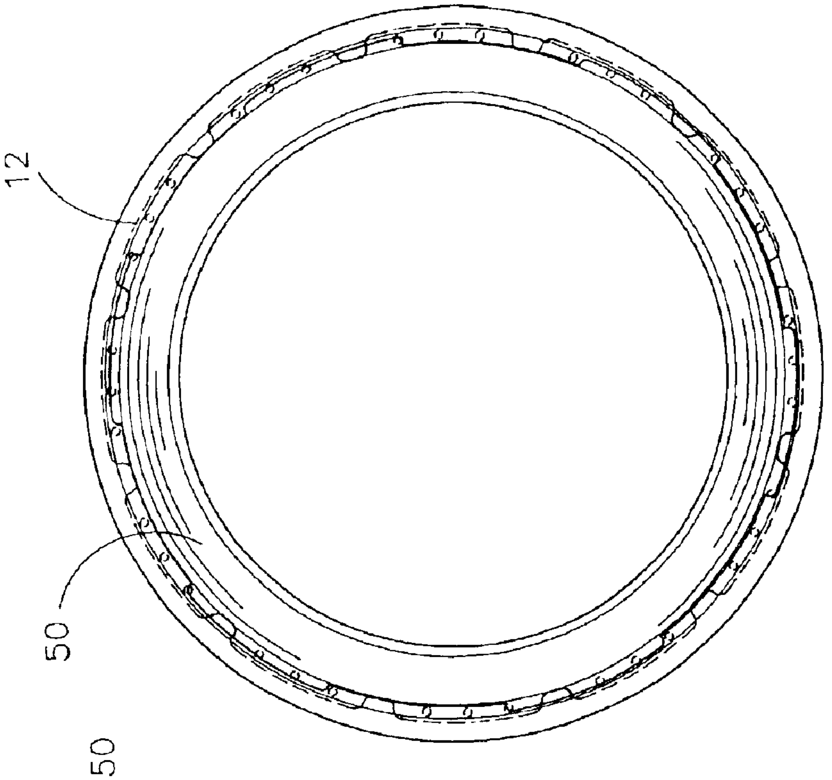
FIG. 7 is a bottom sectional plan view of the present invention.
Figure 6:
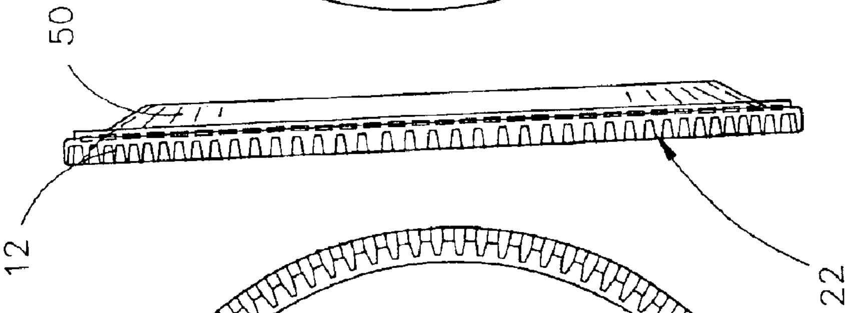
FIG. 6 is a side sectional elevational view of the present invention.
Figure 5:
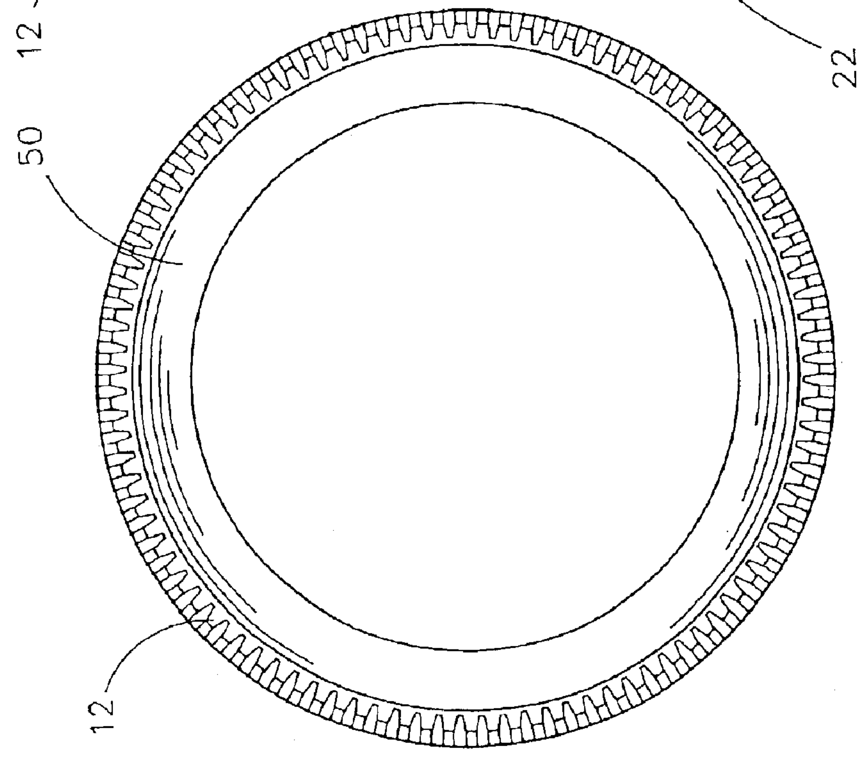
FIG. 5 is a top plan view of the present invention.
Figure 8:
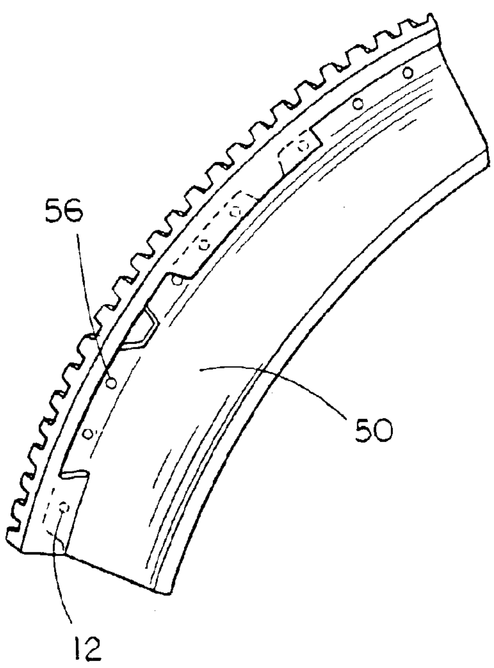
FIGS. 8–10 are partial sectional views of various elements of the present invention.
Figure 9:
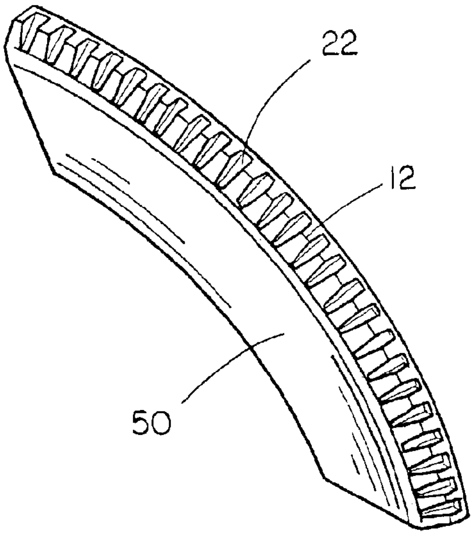
Figure 10:
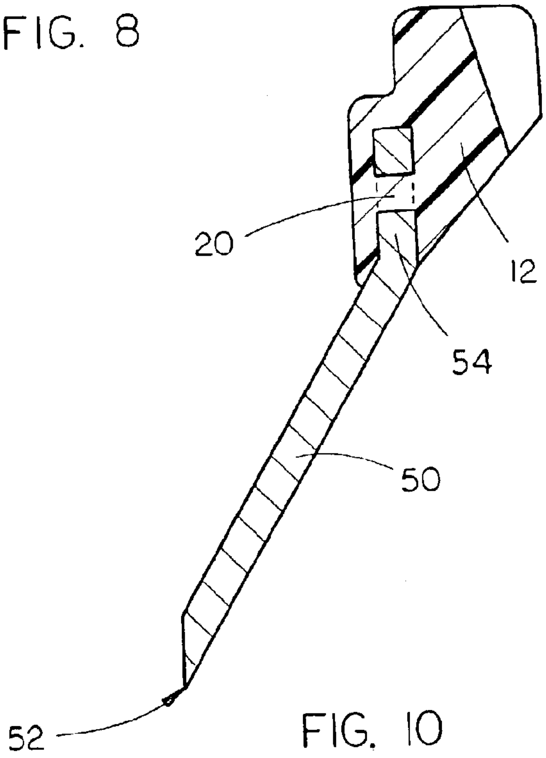

As best shown in FIG. 2, the upper section 54 of blade 50 would fit within slot 20 of lower blade-engaging section 14 and preferably be permanently mounted therein. The outwardly extending tabs 56 shown on upper section 54 of blade 50 provide additional structural stability for the connection between the toroidal ring 12 and blade 50, as the torque forces applied to the blade during the cutting and defatting of meat products can be excessive and unless the molded plastic blade holder 10 of the present invention is securely connected to blade 50, the blade 50 may accidentally dislodge from the blade holder 10 and potentially cause injury. To prevent this, it is expected that the toroidal ring 12 would be permanently molded around upper section 54 of blade 50 by means commonly known in the injection molding industry, although depending upon the construction materials used, it may be practical to provide a snap-fit connection or the like which will withstand the forces being applied to blade 50.

The upper gear-engaging section 16 of toroidal ring 12 would preferably include a plurality of upwardly projecting gear teeth 22 formed integrally with the toroidal ring 12 and designed to intermesh with the drive gear 72 on the boning knife 70, as shown best in FIGS. 2, 5, 6 and 9. The high-impact plastic used in construction of the toroidal ring intermeshing with drive gear 72 results in a much quieter and vibration-resistant intermeshing, thereby alleviating many of the problems found in the prior art. Of course, the number of gear teeth 22 and exact size and shape will be dependent on the size and shape of drive gear 72 and the particular boning knife 70 to which the present invention is to be mounted.

The present invention is designed to be utilized in the same manner as is currently used with the entirely metal blades of the prior art and thus can be exchanged should a new blade be required in the standard manner. Also, as the construction materials of the molded plastic blade holder 10 of the present invention may be varied, the durability and longevity of the present invention may be modified and/or changed so long as the operative characteristics are maintained.

It is therefore to be understood that numerous modifications, additions and substitutions may be made to the molded plastic blade holder 10 of the present invention which fall within the intended broad scope of the preceding disclosure. For example, the size, shape and dimensions of the molded plastic blade holder may be modified or changed to fit variously sized boning knives which are used in the meat packing industry, as the intended function of reducing vibration and reducing noise pollution will be maintained. Also, the exact connection between toroidal ring 12 and blade 50 may be modified or changed so long as the connection is secure and prevents accidental dislodging of the blade 50 from toroidal ring 12. Finally, the method by which the present invention is constructed is not critical to the present invention so long as the plastic toroidal ring 12 and blade 50 are securely connected to one another.

There has therefore been shown and described a molded plastic blade holder for a toroidal blade which accomplishes at least all of its intended objectives.

We claim:

1. In combination:

a toroidal rotary knife blade having a sharpened circular lower edge and an upper blade holder engagement section including at least one upper projecting portion adapted to be engaged and secured by a blade holder; and a blade holder for said toroidal rotary knife blade, said blade holder including;

a generally toroidal blade holding ring having an upper gear-engaging section including a plurality of gear teeth formed thereon for intermeshing with a drive means and a lower blade engagement and retention section adapted to receive and retain said toroidal rotary knife blade therein, said lower blade engagement and retention section further including at least one blade projection engagement and securement means operative to securely engage and retain said at least one upper projecting portion of said rotary knife blade therein, said at least one blade projection engagement and securement means operative to prevent substantially all movement of said rotary knife blade relative to said blade holding ring;

said generally toroidal blade holding ring being constructed of material selected from the group consisting of plastic, polyvinyl chloride, polyethylene, polypropylene, polystyrene, vinyl, and polyethylene terephthalate; and said generally toroidal blade holding ring operative to reduce noise and vibration emitted therefrom during rotation of said generally toroidal blade holding ring by a drive means.

2. The combination of claim 1 wherein said generally toroidal blade holding ring is molded onto said toroidal rotary knife blade thereby forming an integral unit.

3. A blade holder for a rotary knife blade, said blade holder including;

a generally toroidal blade holding ring having an upper gear-engaging section including a plurality of gear teeth formed thereon for intermeshing with a drive means and a lower blade engagement and retention section adapted to receive and retain a rotary knife blade therein, said lower blade engagement and retention section further including at least one blade projection engagement and securement means operative to securely engage and retain said at least one upper projecting portion of a rotary knife blade therein, said at least one blade projection engagement and securement means operative to prevent substantially all movement of a rotary knife blade relative to said blade holding ring;

said generally toroidal blade holding ring being constructed of material selected from the group consisting of plastic, polyvinyl chloride, polyethylene, polypropylene, polystyrene, vinyl, and polyethylene terephthalate; and said generally toroidal blade holding ring operative to reduce noise and vibration emitted therefrom during rotation of said generally toroidal blade holding ring by a drive means.

* * * * *